United States Patent [19]
O'Connell et al.

[11] Patent Number: 6,052,581
[45] Date of Patent: *Apr. 18, 2000

[54] AUTOMATIC NAM PROGRAMMING OF RADIO TELEPHONE

[75] Inventors: Donal O'Connell, Farnborough; Tony McKillop, Wokingham, both of United Kingdom; Donald Yiu, Yuen Long, The Hong Kong Special Administrative Region of the People's Republic of China; Alan Grimmett, Guildford; Mike Butler, Hook, both of United Kingdom

[73] Assignee: Nokia Mobile Phones Limited, Espoo, Finland

[ * ] Notice: This patent issued on a continued prosecution application filed under 37 CFR 1.53(d), and is subject to the twenty year patent term provisions of 35 U.S.C. 154(a)(2).

[21] Appl. No.: 08/870,891

[22] Filed: Jun. 6, 1997

Related U.S. Application Data

[63] Continuation of application No. 08/505,055, Jul. 21, 1995.

[30] Foreign Application Priority Data

Jul. 26, 1994 [GB] United Kingdom .................... 9415028

[51] Int. Cl.[7] .................................................. H04Q 7/32

[52] U.S. Cl. .......................................... 455/419; 455/550

[58] Field of Search .................................... 455/418, 419, 455/414, 550, 551, 564–565

[56] References Cited

U.S. PATENT DOCUMENTS

| | | | |
|---|---|---|---|
| 4,734,928 | 3/1988 | Weiner et al. | 455/551 |
| 4,803,717 | 2/1989 | Marui | 379/88.11 |
| 4,817,190 | 3/1989 | Comroe et al. | 455/11 |

(List continued on next page.)

FOREIGN PATENT DOCUMENTS

| | | |
|---|---|---|
| 0 176 104 | 4/1986 | European Pat. Off. . |
| 0 206 391 | 12/1986 | European Pat. Off. . |
| 0 332 825 | 9/1989 | European Pat. Off. . |
| 0478231 | 4/1992 | European Pat. Off. . |
| 0525962 | 2/1993 | European Pat. Off. . |
| 0 630 167 | 12/1994 | European Pat. Off. . |
| 3329267 | 2/1985 | Germany . |
| 60-77539 | 5/1985 | Japan . |
| 2-54636 | 2/1990 | Japan . |
| 2 170 977 | 8/1986 | United Kingdom . |
| 2249459 | 5/1992 | United Kingdom . |
| 2249923 | 5/1992 | United Kingdom . |
| 2256113 | 11/1992 | United Kingdom . |
| 2262630 | 6/1993 | United Kingdom . |
| WO 81/02824 | 10/1981 | WIPO . |
| WO 87/01537 | 3/1987 | WIPO . |
| WO 88/10039 | 12/1988 | WIPO . |
| WO 93/01687 | 1/1993 | WIPO . |
| WO93/10618 | 5/1993 | WIPO . |

OTHER PUBLICATIONS

Over–The–Air Activation Teleservice (OATS), Dec. 15, 1995, pp. 329–368.

"Proposed New SMS Services", SMS.JEM/94.03.21, Mar. 22, 1994, Seppo Alanara.

"Proposed Feature/Service Code List", TR45.3.6/94.04.06.16, Digital Cellular Systems, Mark Wells et al., Apr. 5–7, 1994.

"SMS Cellular Messaging Teleservice (CMT)", IS–136.1, Rev. O, May 17, 1995, pp. 286–307.

Nec's Advanced Mobile Cellular Telephone Featuring Hands–Free Answering, Telephone News, vol. 10, No. 22, Jun. 1989.

*Primary Examiner*—William G. Trost
*Attorney, Agent, or Firm*—Perman & Green, LLP

[57] ABSTRACT

Apparatus for remotely programming a radio telephone with identification data. The apparatus receives and decodes DTMF signals indicative of the identification data and controls storage of the identification data at predetermined memory locations in the radio telephone.

4 Claims, 9 Drawing Sheets

U.S. PATENT DOCUMENTS

| | | | |
|---|---|---|---|
| 4,833,701 | 5/1989 | Comroe et al. | 455/509 |
| 4,837,800 | 6/1989 | Freeburg et al. | 455/557 |
| 4,860,336 | 8/1989 | D'Avello et al. | 455/558 |
| 4,864,599 | 9/1989 | Saegusa et al. | 455/411 |
| 4,893,335 | 1/1990 | Fuller et al. | 379/200 |
| 4,958,368 | 9/1990 | Parker | 379/91.01 |
| 4,972,457 | 11/1990 | O'Sullivan | 455/556 |
| 5,046,082 | 9/1991 | Zicker et al. | 455/419 |
| 5,058,150 | 10/1991 | Kang | 379/58 |
| 5,097,502 | 3/1992 | Suzuki et al. | 379/356 |
| 5,109,403 | 4/1992 | Sutphin | 455/419 |
| 5,155,860 | 10/1992 | McClure | 455/89 |
| 5,276,729 | 1/1994 | Higuchi et al. | 455/564 |
| 5,297,191 | 3/1994 | Gerszberg | 455/419 |
| 5,297,192 | 3/1994 | Gerszberg | 455/419 |
| 5,325,418 | 6/1994 | McGregor et al. | 379/59 |
| 5,351,235 | 9/1994 | Lahtinen | 370/259 |
| 5,359,652 | 10/1994 | Mulder et al. | 379/386 |
| 5,371,782 | 12/1994 | Casey, III et al. | 455/465 |
| 5,479,476 | 12/1995 | Finke-Anlauff | 455/550 |
| 5,487,108 | 1/1996 | Atkins et al. | 379/59 X |
| 5,577,103 | 11/1996 | Foti | 455/412 |
| 5,588,042 | 12/1996 | Comer | 455/413 |
| 5,603,084 | 2/1997 | Henry, Jr. et al. | 455/419 |

AUTOMATIC NAM PROGRAMMING OF RADIO TELEPHONE

This application is a continuation of copending application(s) Ser. No. 08/505,055 filed on Jul. 21, 1995.

BACKGROUND OF THE INVENTION

The invention relates to programming a radio telephone. Before a radio telephone bought off-the-shelf is fully functional it is necessary for the purchaser to sign up with a service provider. Although a telephone is manufactured with a unique Electronic Serial Number ESN, in order to connect to a radio telephone system of the purchasers choice (eg Cellnet or Vodaphone in the UK), the radio telephone must be provided with sufficient information to identify the radio telephone user and the system to which it is connected. This information is provided in the Number Assignment Module (NAM) information.

The NAM information includes a Mobile Identification Number (MIN) and data indicating the service provider chosen. In addition to this information relating to the specific radio telephone and service provider, the NAM includes security data used during registration to confirm the identity of the radio telephone and data providing details of a 'Home Traffic Area' and 'System Control Channels'. The details of the 'System Control Channels' may include information relating to the level of service requested such as an access overload class providing information relating to the relative priority given to calls made by the specific subscriber. The radio telephone uses all this NAM information along with its ESN to gain access to the chosen radio telephone system.

A person buying a radio telephone expects to leave the store with a telephone ready for use. It is therefore necessary or, at the very least, highly desirable for the NAM information to be entered at the point of sale. This is currently achieved by a sales assistant programming the relevant data into a telephone. The data is obtained from the chosen service provider by telephone and is usually entered through the key pad of the radio telephone. This method of data entry has a number of drawbacks. It is slow as the sales assistant must ring the service provider, request the relevant data, write it down, and finally laboriously enter it via the radio telephone keypad. It is open to error as the assistant may write down or enter the data incorrectly. It is relatively insecure as the data can be intercepted and vital programming codes are known at the point of sale, and the process is complicated. Sales assistants dealing with a variety of products and perhaps selling only one telephone every few days will have to be constantly reminded of how to programme the information into the telephone with the attendant possibilities of error. One consequence of all this is that the purchaser may have to return to the retailer a few hours after the purchase is completed to collect the fully operational telephone. This is clearly not desirable.

In some stores the NAM information is programmed into the radio telephone using a computer. Instead of directly entering the data via the keypad of the radio telephone the sales assistant enters the relevant information via a computer keyboard. An interface box is used to link the telephone to the computer and to provide the necessary level of security. This provides an advantage over the manual system in that the information is seen on the computer screen prior to entry so that mistakes in keying-in can be corrected more easily. In addition the interface box holds the security information so it is not known at the point of sale. It also has the advantage that, as much of the programmed information will be common to all radio telephone subscribers only the unique identification information and those unusual requirements chosen by the purchaser need actually to be keyed-in. This reduces the chances of error and speeds up the process. In essence, however, this method is merely the computerization of the manual system discussed above.

Although programming via computer provides some advantages over the manual process it is an expensive way of providing a relatively small improvement in efficiency and security. Not all retail outlets have a convenient computer and the dedicated interface box is an additional unwelcome expense. As a consequence this system is not often used.

SUMMARY OF THE INVENTION

According to a first aspect of the invention there is provided an apparatus adapted to receive signals representative of character indicative frequencies for programming a radio telephone with data, the apparatus comprising means for decoding received signals representative of frequencies and means for controlling the storage of data derived from the decoded signals at predetermined memory locations in the radio telephone.

The invention provides the advantage that data can be input at a position remote from the point of sale enabling, for example, NAM information to be input by a representative of a subscriber system who will be continually providing the required information. The access codes to enable programming will be known only to the person inputting the information. This improves security. The person inputting the information will also be better versed in the programming procedure thereby reducing errors in data input.

The apparatus will preferably be adapted to receive signals via the radio telephone. This has the advantage that no additional connection is needed to link the apparatus to the service provider or other data providing centre for down loading the data. This reduces the cost of the system. The information could, however, be received directly via a land line.

The radio telephone will desirably be physically coupled to the programming apparatus by, for example, a serial line. This provides a quick route for transmitting data for storage at the predetermined memory location of the radio telephone.

The apparatus is adapted to control display of the data on the display of the radio telephone prior to storage. This gives, for example, the sales assistant or other person at the point of sale the opportunity to check that the information received by the radio telephone corresponds to that transmitted by the service provider.

A data recording device such as a printer or a computer may be used to generate a record of the data programmed into each radio telephone.

According to a second aspect of the present invention there is provided a method for programming a radio telephone comprising the steps: receiving signals representative of character indicative frequencies; decoding the received signals; and storing data derived from the decoded signals at predetermined memory locations in the radio telephone.

In accordance with a third aspect of the invention there is provided a radio telephone comprising means for receiving signals representative of character indicative frequencies, means for decoding the received signals and means for controlling the storage of data derived from the decoded signals at predetermined memory locations.

This provides the advantage that the decoder and means for controlling are part of the radio telephone and allows the phone to be programmed to enable previously hidden menu locations and/or menu functions. This can be effected at the point of sale or at a later date at the user's instigation.

BRIEF DESCRIPTION OF THE DRAWINGS

The invention will now be described in greater detail with reference to FIGS. 1 to 10 of the drawings of which.

DETAILED DESCRIPTION OF THE INVENTION

Radio telephones are often able to make one call to a previously arranged number owned by the Network Manager before the telephone is connected to a subscriber system. This embodiment of the invention utilises this facility to provide a connection with a service subscriber through which all the NAM information required to make the telephone operational is received.

Figure 1:
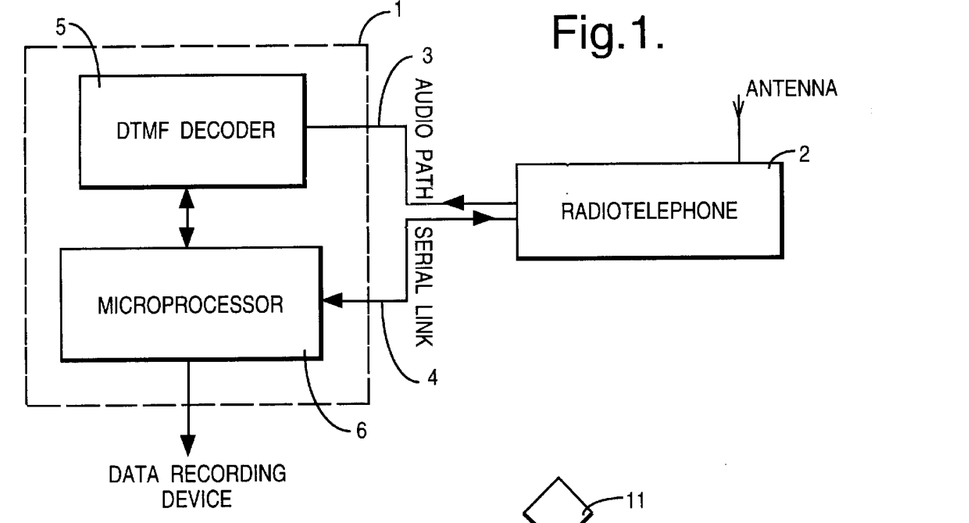
FIG. 1 is a schematic representation of an automatic NAM programmer of an embodiment of the invention.

FIG. 1 is a block diagram of an embodiment of the invention. An automatic NAM programmer 1 is connected to a radio telephone 2 via an audio path 3 and a serial path 4. These connecting paths will typically be part of an 8-wire interconnecting cable. The radio telephone receives the NAM information transmitted using Dual Tone Multi Frequency (DTMF) which is a data signalling method in which specific pairs of tones represent digits and characters. Each DTMF signal consists of two sinusoidal components, one from a high group of three frequencies, in the present case (1209, 1336, 1477 Hz), and one from a low frequency group of four frequencies (697, 770, 852, 941 Hz). A unique pair of frequencies is assigned to each key label. The DTMF signals received over the air during programming are provided to the NAM programmer 1 via the audio path of the 8-wire bus. Although the NAM programmer 1 of the embodiment described receives the NAM information in this way, it is possible that the NAM information could be received via a land line connected to the automatic programmer in a similar way to the radio telephone.

The DTMF data can be input by the service provider through a telephone keypad or sent from a computer database whichever is more convenient. Other means for producing a signal indicative of the NAM data may, however, be used by the service provider.

Once the NAM information is received via the audio path it is decoded by a DTMF receiver 5 and processed in a microprocessor 6 to provide the data in a form suitable for storage at predetermined memory locations in the radio telephone 2. Storage of the data at the predetermined memory locations in the radio telephone is controlled by the microprocessor 6 via the serial link 4. The microprocessor 6 can also, amongst other things, control the radio telephone so that NAM data can be displayed prior to storage for checking. In addition the microprocessor provides the capacity for decrypting the ESN number and encoding the NAM information.

The radio telephone 2 will be powered by a battery pack which could also be used to power the automatic NAM programmer 1. The NAM programmer 1 could, however, be plugged directly into a mains derived d.c. supply.

The operation of the automatic NAM programmer 1 will now be described in greater detail with reference to its specific use in programming a mobile telephone having a handset and a transceiver. Such mobile telephones will typically be used in the United States operating under the AMPS system. The specifics of the embodiment of the invention can, however, readily be adapted to provide a NAM programmer for use with any type of radio telephone designed to operate under any protocol.

Figure 2:
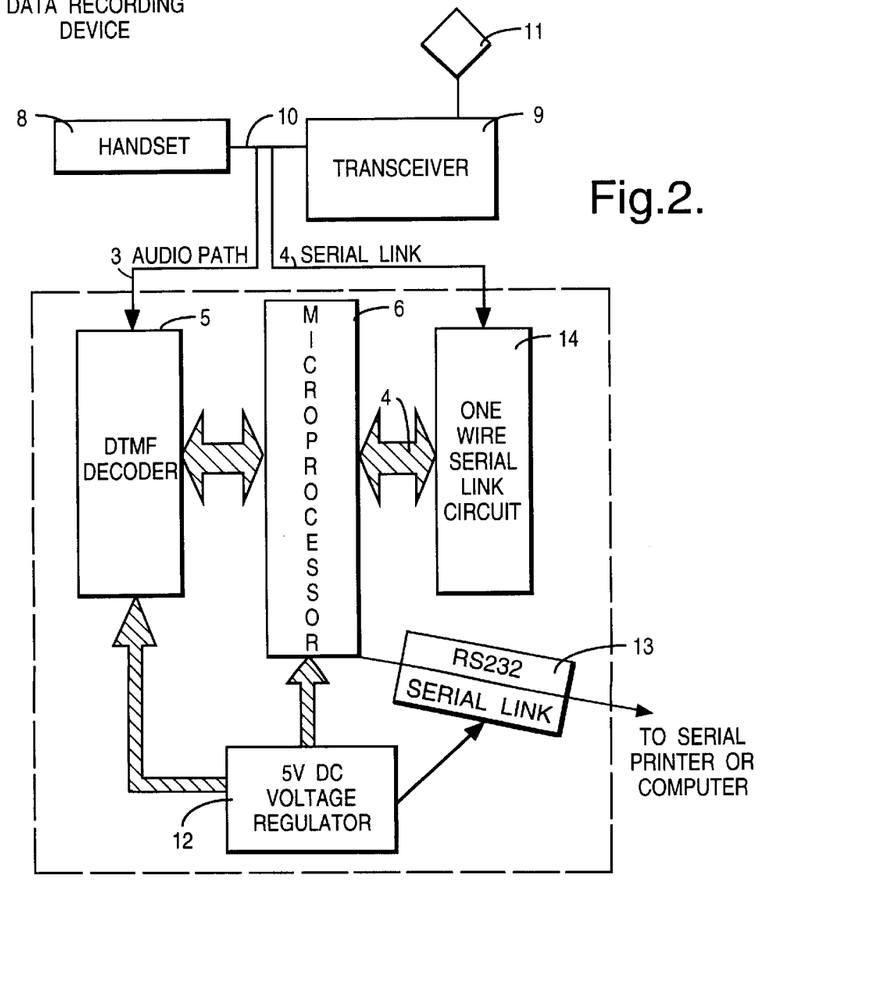
FIG. 2 is a schematic representation of the interconnection between the NAM programmer of FIG. 1 and a mobile radio.

FIG. 2 is a more detailed block diagram of an embodiment of the automatic NAM programmer 1 for use with a mobile telephone. The radio telephone 2 is a mobile telephone in two parts, a handset 8 and a transceiver 9, connected by an 8-way cable 10. The automatic NAM programmer is connected to both the handset 8 and the transceiver 9 via the audio path 3 and the serial link 4. The transceiver 9 receives DTMF signals via an antenna 11. A voltage regulator 12 is provided for regulating the voltage to the microprocessor 6, the DTMF decoder 5 and a RS232 serial link 13 which provides the option of a link to a serial printer or computer. The Serial Communications Interface (SCI) in this particular embodiment of the invention is a two wire full duplex UART type asynchronous system. However, in a mobile phone the serial communications link is typically a one wire half duplex system. Therefore, a one wire serial link circuit 14 is provided to convert the two wire link to a one wire link.

Two 8-way telephone sockets are provided on the casing of the NAM programmer 1 for connecting the handset 8 and the transceiver 9 to the programmer 1. A D-type pin is optionally provided for connection to a computer or serial printer for compiling a database of NAM/ESN information. The interconnection between the automatic NAM programmer and the mobile radio can be seen in FIG. 2.

Figure 3:
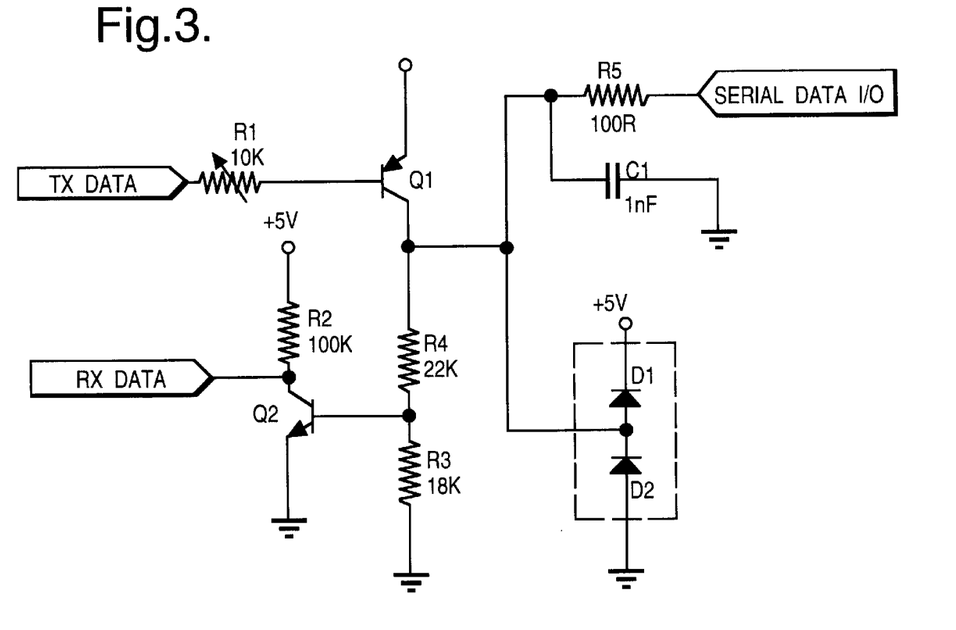
FIG. 3 is a schematic representation of the one wire serial link circuit of FIG. 2.

The one wire serial link circuit 14 is illustrated in FIG. 3. Amplification and shaping networks are inserted on each line of the bus. The transistor Q1 is the amplifier for the Transmit Data Out (TDO) and the transistor Q2 is the amplifier for the Received Data In (RDI). The two diodes D1 and D2 serve as a voltage limiter to protect the link in case of power failure and over voltage surges. The shaping network is formed by R5 and C1.

Figure 4:
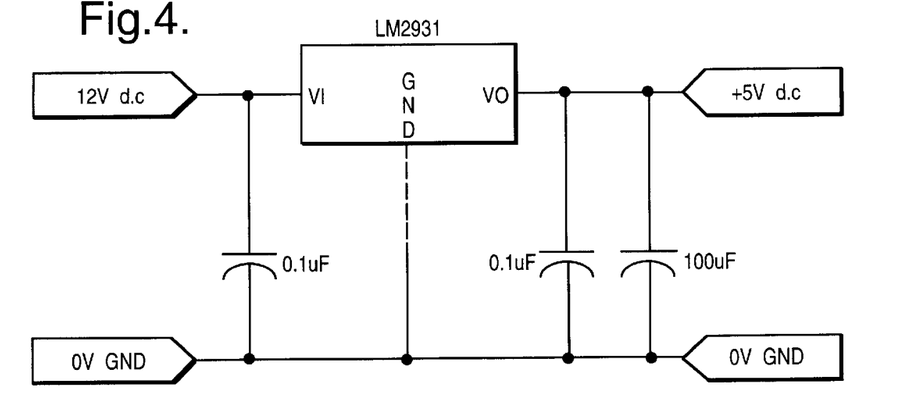
FIG. 4 is a schematic representation of the voltage regulator of FIG. 2.

The voltage regulator is illustrated in greater detail in FIG. 4. A 12 volt dc power supply is provided from the transceiver and is regulated by a LM2931T to provide an +5V dc rail for the DTMF decoder 5, the microprocessor 6, and the RS232 Serial Link 13 (when present).

Figure 5:
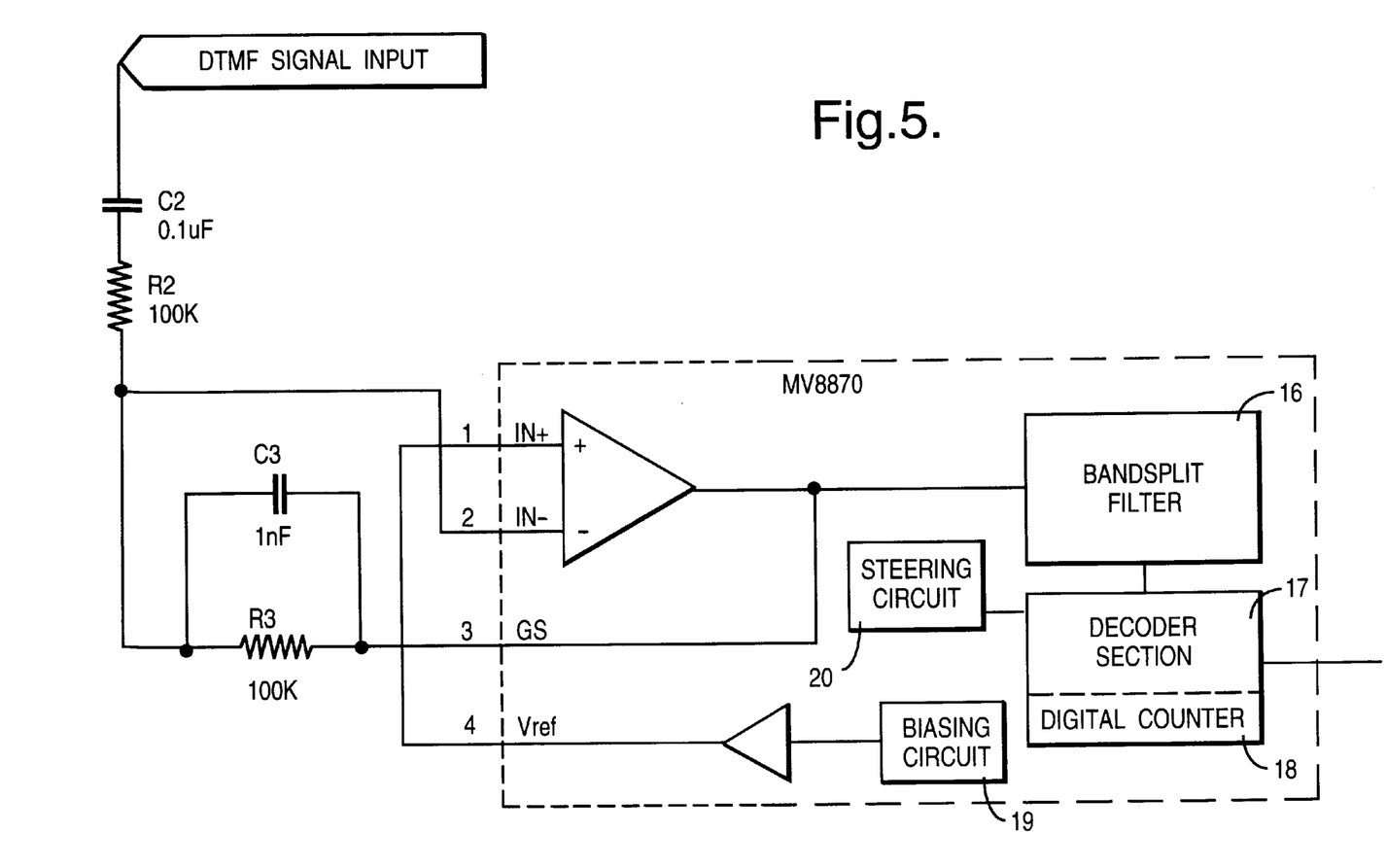
FIG. 5 is a schematic representation of the DTMF decoder of FIG. 2.

The DTMF decoder 5 is illustrated in greater detail in FIG. 5. The DTMF signal for decoding is received on the mobile phone receiver's audio path 3.

In this embodiment an integrated DTMF decoder MV8870 15 is used. The MV8870 provides a bandsplit filter 16 and a digital decoder section 17. The bandsplit filter 16 separates the high and low tone groups. The decoder section 17 includes a digital counter 18 that verifies that the frequencies of the received tones correspond to standard DTMF frequencies. The DTMF's frequency range is from 697 Hz up to 1633 Hz, any frequencies higher than 1633 Hz are unwanted, so to limit the bandwidth of the front-end operational amplifier, a capacitor C3 is added across the resistor R3 to form a low pass filter with a cut-off frequency at 1.7 kHZ.

The input pins IN+ and IN− are respectively the non-inverting and inverting inputs to the front-end operational amplifier. The GS (Gain Select) pin is connected to the output of the front-end operational amplifier. Feedback resistors R3 and R2 control the front-end gain. The front-end operational amplifier has a very wide bandwidth. The input of the DTMF decoder is configured as an inverting amplifier with unity gain. A biassing circuit 19 biases $V_{ref}$ pin at $V_{ss}$ ÷2 (2.5 V). C2 provides a.c. coupling of the DTMF audio signal to prevent upsetting the d.c. levels in the DTMF decoder.

The decoder determines the frequencies of the incoming tone pairs. When the decoder detects the simultaneous presence of two valid tones a steering circuit 20 further validates the signal by checking they are of sufficient duration. The decoded digital signal is then provided as a 4-bit binary code to the output bus.

Figure 6:
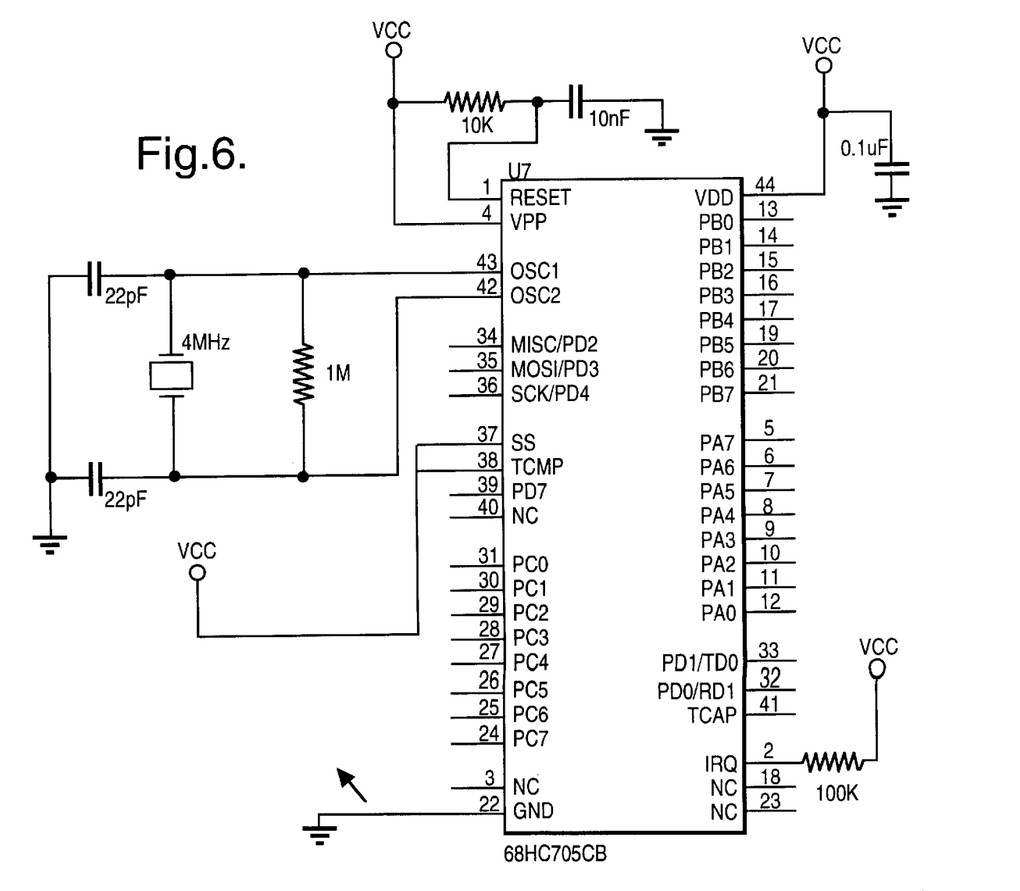
FIG. 6 is a schematic representation of the microprocessor of FIG. 2.

The microprocessor is illustrated in greater detail in FIG. 6. In this example the microprocessor chosen is a MC68HC705C8. This is an 8-bit microprocessor which contains on-chip RAM, ROM, serial interfaces and a timer. An external 4 MHz crystal 21 controls the internal oscillator frequency, and the internal clocks are driven from a divide-by-two circuit.

The decoded data output from DTMF decoder 5 is connected to the I/O port A (PA0–PA4) of the microprocessor. When the microprocessor has obtained the data, it is processed and the decoded information is sent to the mobile phone.

Operation of the microprocessor 6 is controlled through application software. Software is used to control the interpretation of decoded DTMF data from the DTMF decoder 5. It is also used to control communication between the NAM programmer microprocessor and the microprocessors of the handset and transceiver to, amongst other things, display information on the handset's LCD display. The encoding of the NAM data and decryption of the ESN data is also implemented through software in this embodiment.

Figure 7:
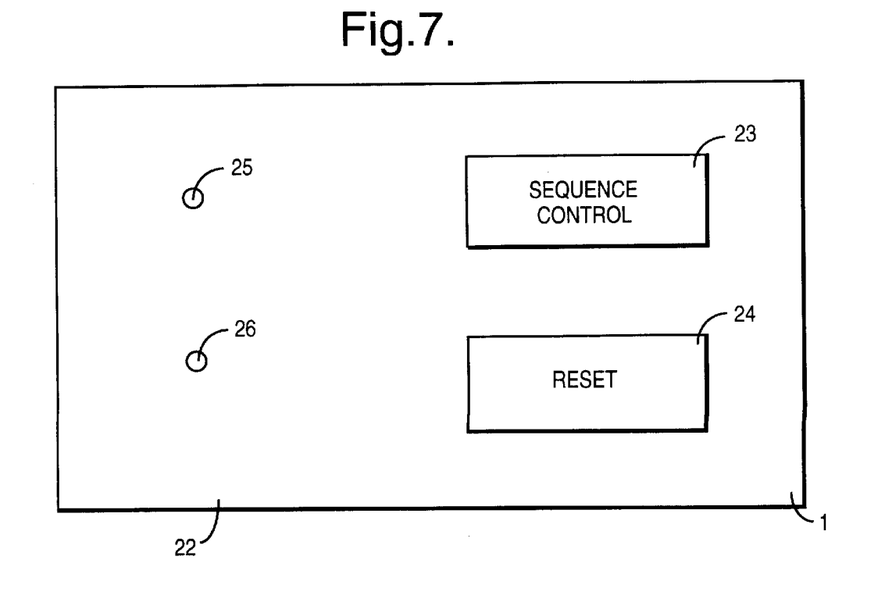
FIG. 7 is a schematic representation of the NAM programmer of FIGS. 1 and 2.

FIG. 7 is a schematic representation of a control panel 22 of the automatic NAM programmer 1. The NAM programmer 1 was designed with simplicity of operation in mind. In this regard the box is provided with only two input buttons SEQUENCE CONTROL 23 and RESET 24. It is also provided with two LEDs one green 25 and one red 26.

Figure 8A:
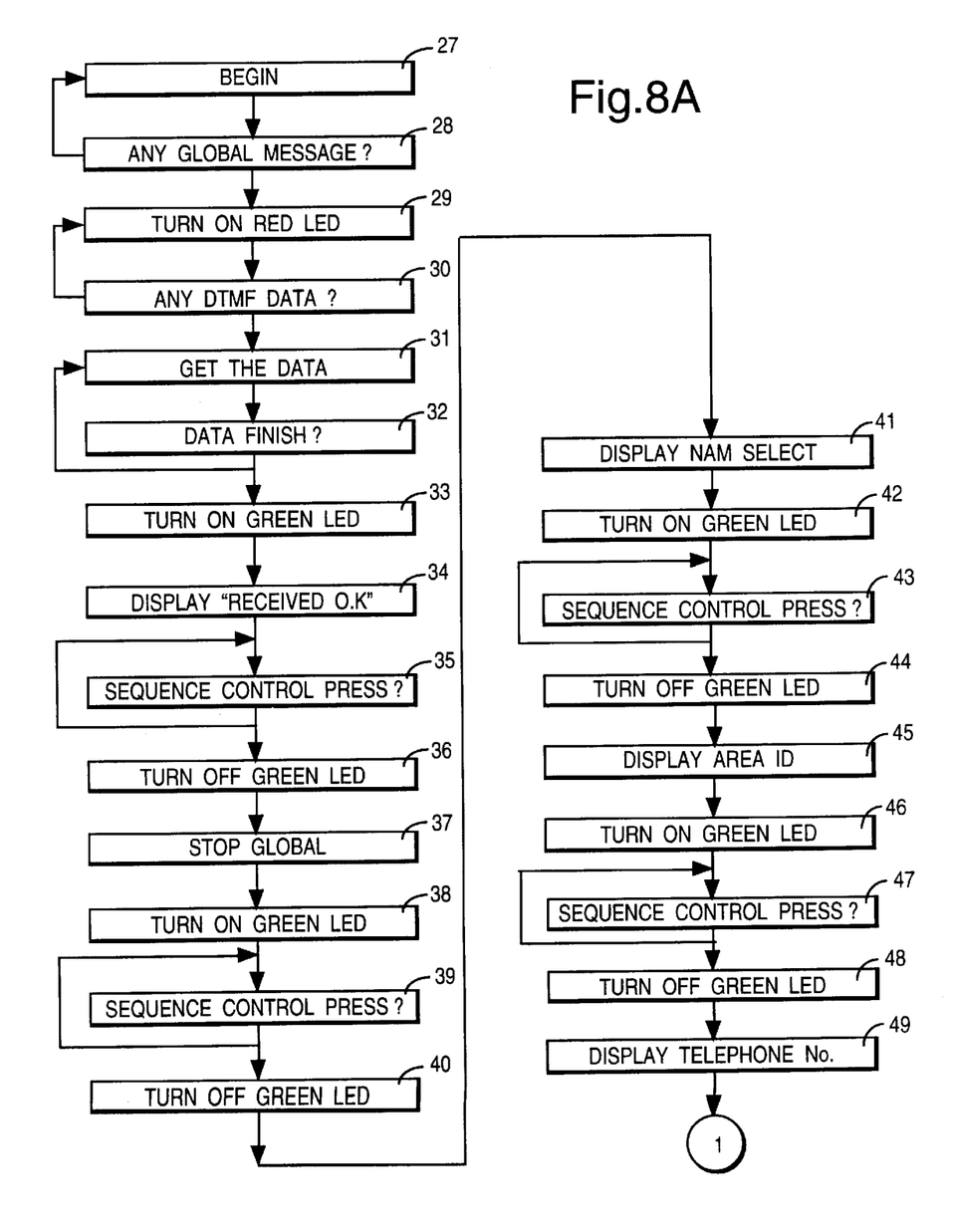
FIGS. 8A to 8C are flow charts illustrating operation of the microprocessor of FIG. 2.
Figure 8B:
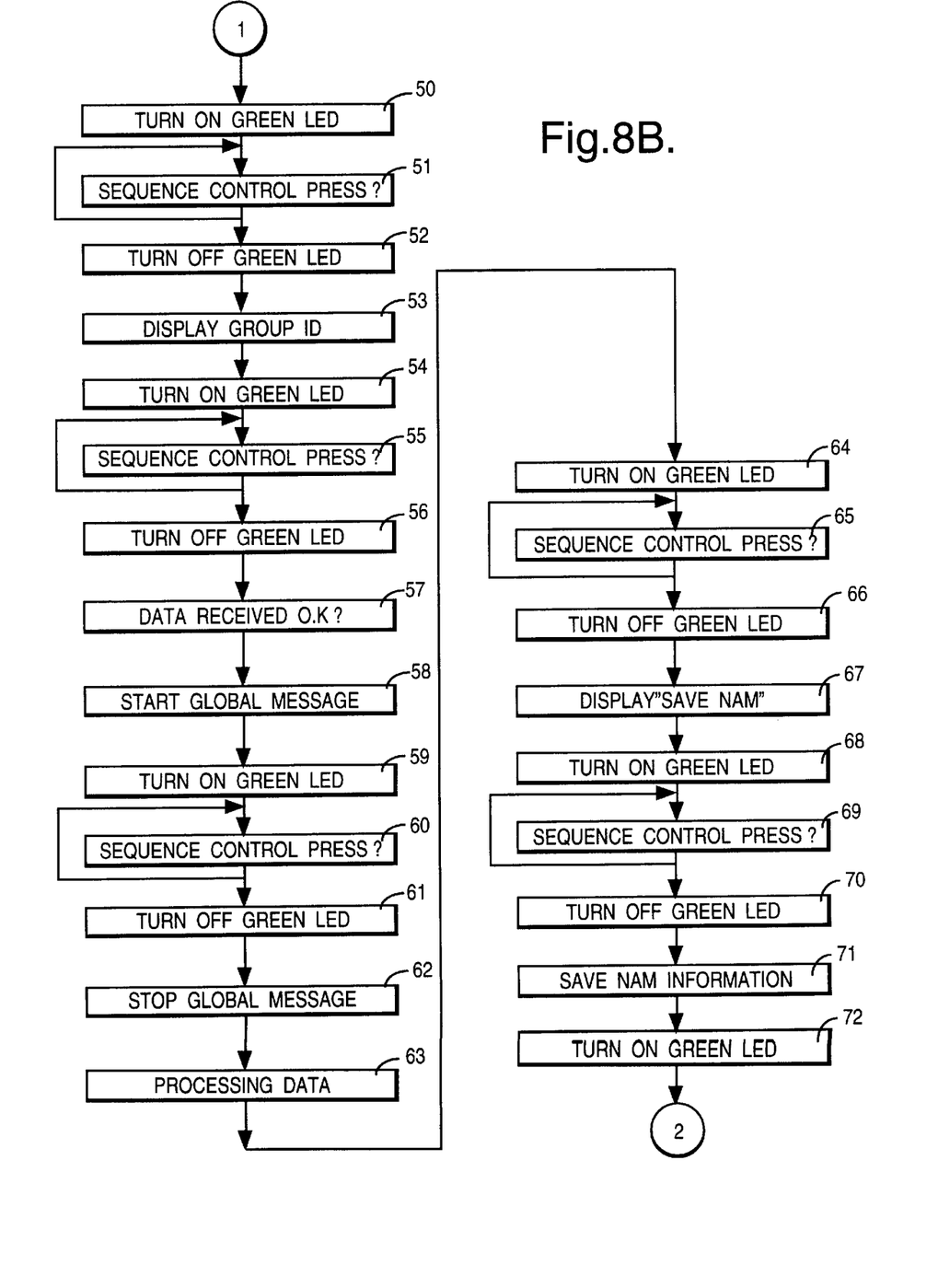
Figure 8C:
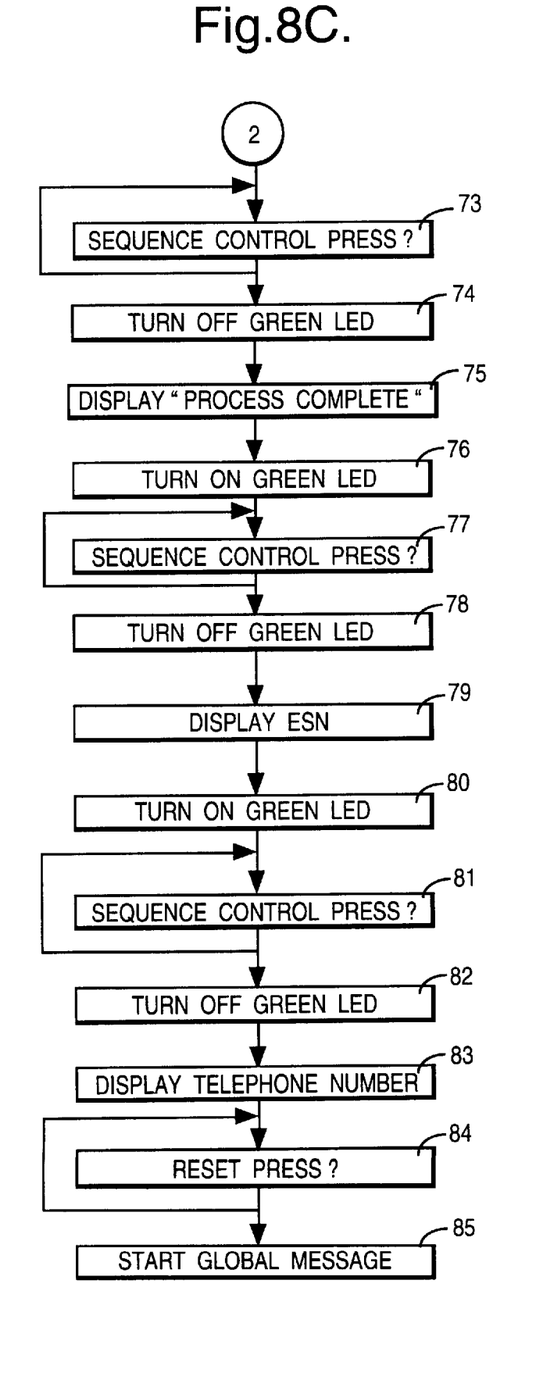
Figure 9:
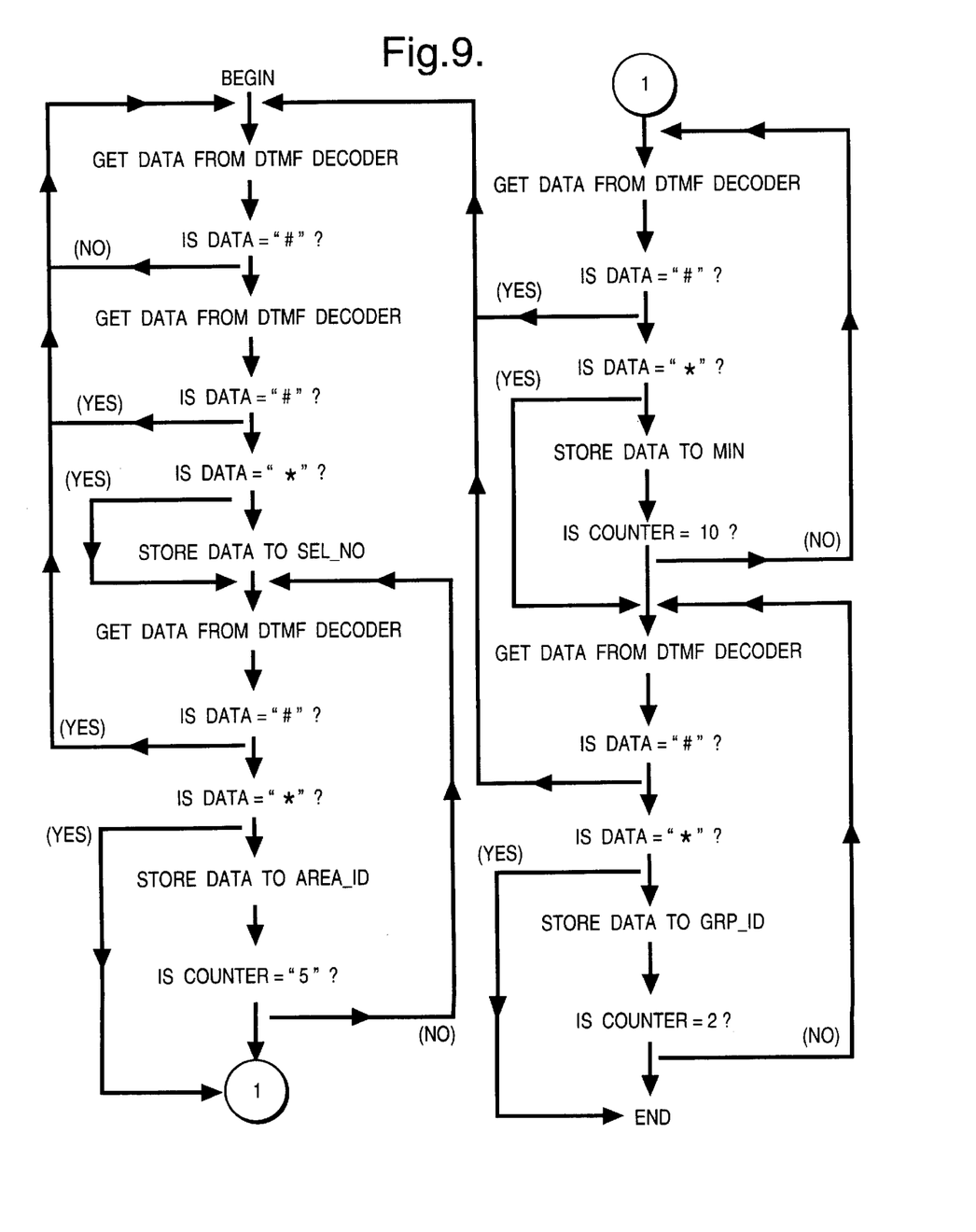
FIG. 9 is a flow chart illustrating the operation of the software controlling the reading of DTMF data from the DTMF decoder.

The operation of the device at the point of sale and software will be described in greater detail with reference to FIGS. 8 and 9.

A sales assistant at the point of sale will attach the mobile telephone under purchase to the automatic NAM programmer 1 which will ideally be positioned along side the credit card machines at the till. The sales assistant will power up the mobile telephone and switch on the NAM programmer 1, and wait until this operation causes the red LED 26 on the automatic NAM programmer 1 to light up (step 27 FIG. 8A).

Once the transceiver of the mobile phone is switched on it sends a GLOBAL signal and status message at a fixed interval to the handset. The GLOBAL signal is used by devices to indicate when the transceiver is ready to receive a command. In the present embodiment of the invention this message is used to check the communication link between the NAM programmer 1, and the transceiver 9 and the handset 8. Once the global message is detected (step 28) by the NAM programmer 1 it means the transceiver 9 and the handset 8 are turned on and the red LED 26 lights up (step 29). Using the Service Provider's previously arranged number, the sales assistant will then dial the number of the subscriber system chosen by the telephone purchaser.

The sales assistant will give the subscriber any required information such as the purchaser's name and address and the priority of service required by the customer and request that the mobile telephone on which he/she is calling be assigned the next MIN of that subscriber system. In calling the subscriber, the mobile telephone will have identified itself using its ESN so the mobile telephone system will have information regarding the unique identity of the mobile telephone being attached to the system. This is the limit of the input from the sales assistant. The service provider, who is more specialised, or at least has more experience than the sales assistant in providing NAM information, sends the NAM data over the air to the mobile telephone.

The service provider in this example inputs the NAM data as DTMF signals in accordance with a predetermined protocol by pressing keys of a telephone keypad.

In this example the NAM data is entered as a sequence of key labels as follows:

| # NAM number | * Area ID | * Telephone no. | * Group ID * |
|---|---|---|---|
| 1 digit | 5 digit | 10 digit | 2 digit |

If a digit is entered incorrectly the service provider can restart the process by pressing the # key and starting the data sequence again. Having established that the handset and receiver are turned on, the microprocessor checks to see whether there is any decoded DTMF data on the input (step 30). The microprocessor checks that the decoded signal is valid, if so the output from the DTMF decoder is received (step 31). The manner in which data is obtained and the sequence of data procedure for checking against the NAM data protocol is shown in FIG. 9. If the sequence is incorrect an error flag is set and the whole process must be restarted. If the data is correct it is stored to memory (steps 31, 32).

Once all the data has been received, the green LED 25 lights up (step 33) and the message "RECEIVED OK" is displayed (step 34). This is the sales assistant's cue to press a button marked SEQUENCE CONTROL 23 also present on the casing which causes the green LED 25 to turn off. Under normal operation conditions the transceiver sends the GLOBAL message through the serial link every 70 msecs. This has the potential to corrupt the commands sent to the handset through the serial link when, for example, it is about to control operation of the serial link by sending display data to the handset.

When the sales assistant presses the SEQUENCE CONTROL button 23 again the NAM programmer 1 breaks its communication link with the transceiver 9 of the mobile telephone by sending a STOP GLOBAL MESSAGE command (step 37) leaving the mobile telephone free for communication between the sales assistant and the service provider. If the GLOBAL message stops, the transceiver assumes that the serial link is broken and performs a shutdown procedure, i.e. it no longer controls the operation of the handset via the serial link. If a call is in progress when a shutdown occurs it will be held "ON" until the serial link is reestablished and a TERMINATE command is sent by the handset to the transceiver along the serial link.

Once the STOP GLOBAL MESSAGE has been sent the green LED 25 turns on (step 38) once more. This is the signal to the sales assistant that the automatic NAM programmer is ready; the NAM information has been obtained from the DTMF decoder and can now be displayed in sequence on the handset LCD to allow the actual information received to be checked against the information that should have been transmitted. To enable the information to be displayed, the digital data is converted into ASCII and the display command and the data sent to the handset.

The sales assistant presses the SEQUENCE CONTROL button 23 again (step 39). The service provider is then able to inform the sales assistant of the NAM information that has been transmitted. The information could be given verbally over the telephone for checking or transmitted in some other way. The sales assistant is then prompted by the green LED 25 to press the SEQUENCE CONTROL button 23 to scroll through the NAM data received by the mobile telephone which is viewed on the display of the mobile telephone so that the sales assistant can check the information received against that transmitted by the service provider (steps 41 to 55 of FIG. 8). The display of the mobile telephone is used to view the data received in order to keep the NAM programmer itself relatively simple. The programmer could, however, provide a suitable display itself for viewing the information received should that be desirable.

Once all the information has been verified, the sales assistant terminates the conversation with the service provider. If the data has not been correctly received the RESET button 24 is pressed and the service provider is asked to send the NAM information once again.

When the information has been correctly entered the SEQUENCE CONTROL button 23 is pressed once more (step 55) and the message "RECEIVED OK?" appears on the display. The GLOBAL MESSAGE that gives control of the handset back to the transceiver is restarted (step 58). The green LED 25 turns on (step 59) and the operator must then press the SEQUENCE CONTROL button once more (step 60) if all the data has been received correctly, in order for the data to be processed. When the SEQUENCE CONTROL button 23 is pressed (step 60), the green LED 25 switches off (step 61) and the STOP GLOBAL MESSAGE is sent again (step 62) so that the NAM programmer can control operation of the handset without interference. After the information received from the service provider has been displayed by the handset's LCD and checked by the sales assistant against the transmitted data the microprocessor 6 begins to process the data (step 63). The 10 digit directory telephone number is decoded to a 34 bit binary MIN. The Area identification number and Group Identification are also decoded. The decoded and defined data are then arranged in 32 byte NAM format. Lastly the ESN of the mobile phone is obtained and decrypted.

Once the data has been processed, the green LED 25 lights up once again (step 64) and the sales assistant must press the SEQUENCE CONTROL button 23 to continue the process (step 65).

When the SEQUENCE CONTROL button 23 is pressed the green LED turns off (step 66) and the message "SAVE NAM?" (step 67) appears on the display. To save the information the sales assistant presses the SEQUENCE CONTROL button 23 once again (step 69) otherwise the RESET button 24 must be pressed to terminate the procedure without saving the information.

Once the NAM information is in a data stream 32 bytes long it is divided into two 16 byte data streams for storing at respective memory locations. In one particular type of mobile phone the user is able to store four different sets of NAM information at NAMs 1–4. Each NAM has two separate memory locations for storing the respective 16 byte data streams.

After the information has been saved (step 71), the green LED 25 switches on (step 72) and on pressing the SEQUENCE CONTROL button once more (step 73) the message "PROCESS COMPLETE" appears on the display (step 75). The green LED turns on again (step 76) and the SEQUENCE CONTROL button 23 can then be pressed (step 77) to display the ESN of the mobile telephone (step 79) so that the sales assistant can make a note for records. Pressing the SEQUENCE CONTROL button 23 again (step 81) displays the telephone number (step 83) which can again be recorded. As an option, however, these records can be generated automatically if the NAM programmer 1 is linked to a serial printer or computer. To finish the process the RESET button 24 is pressed.

After the NAM programmer has performed these functions it sends a START GLOBAL command to the transceiver (step 85). This allows the transceiver to regain control of the serial link. Once this is achieved the handset can send a TERMINATE command to end the connection with the service provider. The NAM information has been programmed into the mobile telephone which is now fully operational.

The mobile telephone can now be detached from the automatic NAM programmer 1 and presented to the purchaser. The automatic NAM programmer 1 is then free to be used to programme the next mobile telephone.

The telephone has been programmed without the service provider giving any information regarding the access codes for programme entry to anyone at the point of sale. This provides a substantial improvement in security. The sales assistant, who is relatively inexperienced in programming, has done no more than press the appropriate button and check the data received at the phone against that transmitted by the service provider. This provides a substantial reduction in the likelihood of error.

Although an embodiment of the invention has been described for mobile phones designed for operation under the AMPs protocol the invention is suitable for use with other protocols and other types of mobile telephone. In particular the design could be adapted for use for hand portable radio telephones.

As well as being appropriate for programming NAM information into a radio telephone the invention can be applied in other ways, for example, to enable previously hidden menu features or memory locations.

One embodiment of a telephone suitable for allowing additional menu functions to be enabled is described in copending unpublished application no. GB 9126598.3 filed Dec. 14, 1991 our ref: P91020 GB filed as equivalent U.S. patent application Ser. No. 07/987,012, filed on Dec. 7, 1992 incorporated herein by reference. This patent application describes a system in which the hardware for a full selection of menu functions is provided in each radio telephone manufactured. Specific look up tables determine which menu functions are available in particular radio telephones. If the data for the contents of the look up table can be programmed over the air, the menu features available on a particular telephone can be changed. The techniques described in relation to NAM programming can be adapted to programme the contents of the look up table and provide this over-the-air enabling of menu functions.

The techniques described in relation to NAM programming could also be used to enable previously hidden memory locations. These memory locations could be used, for example, to store additional names and telephone numbers.

Figure 10:
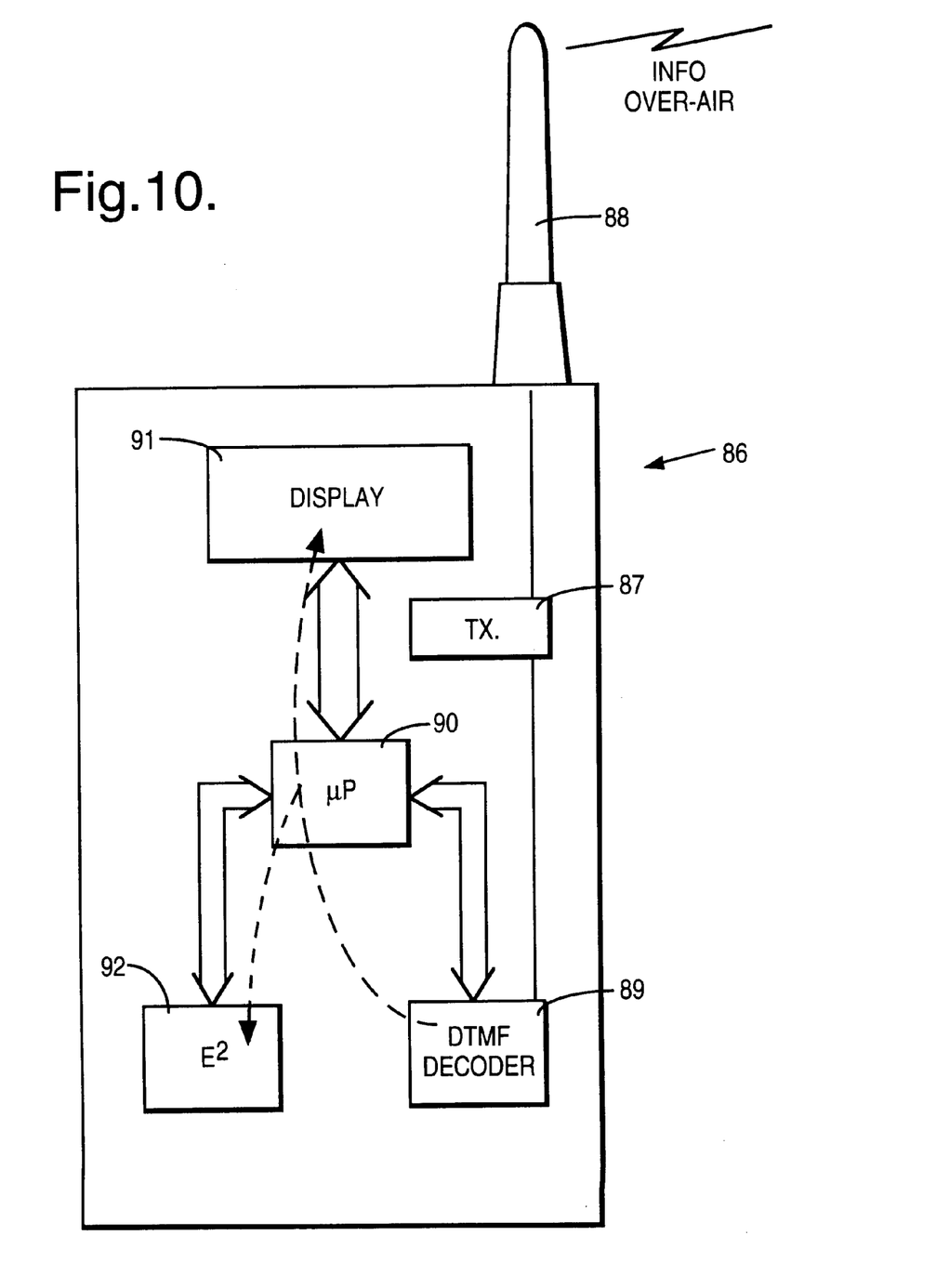
FIG. 10 is a schematic representation of another embodiment of the invention.

Additional features, such as those described above, could be added to a telephone using a dedicated box such as that described for the NAM programming. Another option is, however, to incorporate a decoder and the relevant software into the radio telephone itself. This is illustrated in FIG. 10.

A radio telephone 86 having a transceiver 87 receives signals through an antenna 88. These are decoded by a DTMF decoder 89 and the decoded signals supplied to a microprocessor 90. The microprocessor controls the display 91 and the information that is stored in EEPROM memory 92.

With the decoder and software necessary for programming located in the radio telephone itself or otherwise available to the phone user, individual radio telephones can be reprogrammed at the user's instigation. The user may call a freephone telephone number run by the phone manufacturer or another party if appropriate and request that a feature be added to his or her telephone. Unique identification information would have to be given and a fee payed before the telephone is programmed over-the-air and the requested feature activated. The feature could be activated straight away on initiation of the user or could be activated by the manufacturer or agent to down load the relevant data once the requisite payment has been made.

Providing a DTMF decoder in a radio telephone linked to the radio telephone display provides further opportunities. DTMF signals could be used to send information to telephones and messages or other information could be displayed on the LCD as a result. FIG. 10 also illustrates that the telephone 86 could be connected to a telephone land line to receive programming signals.

In view of the foregoing description it will be evident to the person skilled in the art that various modifications may be made within the scope of the invention. For example the type of data programmed into the radio telephone may be changed to suit specific needs.

What is claimed is:

1. A method for programming a radio telephone comprising the steps:

receiving signals by the telephone, received in response to a user's request, at an antenna of the telephone, the signals being representative of character indicative frequencies;

decoding the received signals provided in response to the user's request by circuitry inside the telephone;

storing data derived from the decoded signals at predetermined memory locations in the radio telephone;

enabling a menu function having user selectable settings in response to the derived data being stored at the predetermined memory locations such that a user can select between the user selectable settings of the enabled menu function, the step of enabling comprising determining which menu functions are available to a user by reviewing at least one look up table stored in the telephone, wherein, prior to enabling the menu function, the selectable settings were not available to a user of the radio telephone, and wherein contents of the at least one look up table are programmed, at least partially, with use of the received signals.

2. A method according to claim 1 wherein the signals representative of character indicative frequencies are signals indicative of frequency pairs.

3. A method as in claim 1 wherein the predetermined memory locations are in the at least one look up table and the step of storing stores the data derived from the decoded signals in the at least one look up table.

4. A method for programming a radio telephone comprising steps of:

receiving radio frequency signals by an antenna of the telephone;

programming contents of at least one look up table of the telephone based upon information contained in the received signals; and enabling a previously unavailable menu function, in response to the step of programming, such that a user can select user selectable settings of the enabled menu function, wherein the step of enabling comprises determining which menu functions are available to the user and which menu functions are not available to the user based upon the contents of the at least one look up table.

* * * * *